(12) United States Patent
Krespach et al.

(10) Patent No.: US 7,661,694 B2
(45) Date of Patent: Feb. 16, 2010

(54) TOWING ASSEMBLY

(75) Inventors: Charles W. Krespach, Fort Myers, FL (US); Robert A. Schmidt, Painesville, OH (US); Jacob S. Belinky, Carleton, MI (US); Richard J. Stanley, Howell, MI (US)

(73) Assignee: Cequent Towing Products, Inc., Plymouth, MI (US)

( * ) Notice: Subject to any disclaimer, the term of this patent is extended or adjusted under 35 U.S.C. 154(b) by 88 days.

(21) Appl. No.: 10/690,412

(22) Filed: Oct. 21, 2003

(65) Prior Publication Data

US 2005/0040623 A1 Feb. 24, 2005

Related U.S. Application Data

(60) Provisional application No. 60/496,095, filed on Aug. 18, 2003.

(51) Int. Cl.
*B60D 1/00* (2006.01)
(52) U.S. Cl. ....................................................... 280/511
(58) Field of Classification Search ................. 280/511; 403/90, 91
See application file for complete search history.

(56) References Cited

U.S. PATENT DOCUMENTS

| 1,988,925 | A | * | 1/1935 | Thomson ..................... 411/424 |
| 1,996,128 | A | | 4/1935 | Thomson |
| 2,549,178 | A | | 4/1951 | Dear |
| 2,650,546 | A | | 9/1953 | Pankratz |
| 2,834,611 | A | | 5/1958 | Chenette |
| 2,911,233 | A | * | 11/1959 | Riddle ..................... 280/416.1 |
| 3,650,546 | A | | 3/1972 | Koenig |
| 3,679,234 | A | | 7/1972 | Colliau |
| 3,876,242 | A | * | 4/1975 | Eaton ......................... 280/511 |
| 4,060,331 | A | | 11/1977 | Domer et al. |
| 4,201,400 | A | | 5/1980 | Hoogenbosch |
| 4,522,421 | A | | 6/1985 | Vance |
| 4,565,345 | A | * | 1/1986 | Templeman ................. 248/481 |
| 4,938,496 | A | | 7/1990 | Thomas et al. |
| 4,993,739 | A | | 2/1991 | Putnam |
| 5,040,817 | A | | 8/1991 | Dunn |
| 5,044,652 | A | | 9/1991 | Brisson |
| 5,085,452 | A | | 2/1992 | Janeiro |
| 5,158,316 | A | | 10/1992 | Hutchmacher |
| 5,290,057 | A | | 3/1994 | Pellerito |
| 5,884,931 | A | | 3/1999 | McCoy |
| D415,986 | S | | 11/1999 | Stech |
| 6,059,480 | A | * | 5/2000 | Maughan et al. ............ 403/131 |
| D438,828 | S | | 3/2001 | Thomas |
| 6,203,050 | B1 | | 3/2001 | Stech |
| 6,739,788 | B1 | * | 5/2004 | Hagemes et al. ............ 403/122 |

(Continued)

FOREIGN PATENT DOCUMENTS

CA 474765 6/1951

(Continued)

*Primary Examiner*—Tony H. Winner
(74) *Attorney, Agent, or Firm*—McDonald Hopkins LLC

(57) ABSTRACT

A towing assembly is provided including a hitch ball receiver having a hitch ball mounting aperture and a recess around the aperture, a hitch ball including a base and a mounting shank where the base is sized and shaped to be received in the recess and a fastener engaging the shank and securing the hitch ball to the hitch ball receiver.

14 Claims, 4 Drawing Sheets

U.S. PATENT DOCUMENTS

| | | | |
|---|---|---|---|
| 6,908,098 B2 * | 6/2005 | Milazzo | 280/511 |
| 2001/0047572 A1 * | 12/2001 | Cassel et al. | 24/279 |
| 2004/0195804 A1 * | 10/2004 | Milazzo | 280/511 |
| 2005/0151349 A1 * | 7/2005 | Irgens et al. | 280/511 |
| 2005/0246869 A1 * | 11/2005 | Chene et al. | 24/279 |

FOREIGN PATENT DOCUMENTS

| | | |
|---|---|---|
| GB | 2038259 | 7/1980 |
| WO | WO 97/22484 | 6/1997 |

\* cited by examiner

TOWING ASSEMBLY

This application claims the benefit of U.S. Provisional Patent Application Ser. No. 60/496,095 filed on Aug. 18, 2003.

TECHNICAL FIELD

The present invention relates generally to the towing field and, more particularly, to a towing assembly including a hitch ball that is locked in position on a hitch ball receiver such as a hitch bar, draw bar and ball mount head so as to prevent relative rotation of the hitch ball during installation and connection with a hitch ball fastener.

BACKGROUND OF THE INVENTION

Trailer hitches including a hitch ball for connecting a towing vehicle to a trailer have long been known in the art. Examples of such are disclosed in a number of patents including, for example, U.S. Pat. No. 3,482,856 to Reese, U.S. Pat. No. 3,694,006 to Goode et al., U.S. Pat. No. 3,768,837 to Reese, U.S. Pat. No. 4,033,601 to Lindahl et al. and U.S. Pat. No. 5,375,867 to Kass et al.

Most hitch balls are either directly mounted to (1) a draw bar or (2) a ball mount head carried on a hitch bar by means of a threaded mounting shank and cooperating locking-nut or nut and lock washer. More specifically, the threaded mounting shank extends through an aperture in the draw bar/ball mount head and the locking nut or nut and locking washer combination are snugly tightened against the draw bar/ball mount head to secure the trailer hitch ball in position. While this provides a very adequate connection, many individuals are frustrated when the hitch ball rotates in the hitch ball receiver when attempting to tighten the securing nut. When this occurs, it is not possible to complete the tightening operation unless tools are employed to hold the hitch ball and prevent its rotation.

A need is therefore identified for an improved structural arrangement whereby a hitch ball may be secured against rotation relative to the hitch ball receiver during installation and connection of the fastener to the stem of the hitch ball.

SUMMARY OF THE INVENTION

In accordance with the purposes of the present invention as described herein, a new and improved towing assembly is provided. That towing assembly includes (a) a hitch ball receiver including a hitch ball mounting aperture and a recess around that aperture; (b) a hitch ball including a base and a mounting shank wherein the base is sized and shaped to be received in the recess; and (c) a fastener engaging the shank and securing the hitch ball to the hitch ball receiver. The hitch ball receiver may take a number of forms including but not limited to a ball mount head such as utilized on a weight distributing trailer hitch assembly and a hitch bar, draw bar or the like which may or may not include a tongue.

More specifically describing the invention, the recess is acircular in shape. Thus, for example, the recess may assume an oval, polygonal, square, rectangular, hexagonal or star shape. If desired, the recess may take the form of a channel. The recess also includes a sidewall engaging the base of the hitch ball. More specifically describing the invention, the hitch ball receiver includes a first face and a second face with the recess being provided in the first face. Still further, the towing assembly includes a second recess. This second recess is provided in the second face. Still further, a spacer is provided. The spacer is sized and shaped to be received in either of the first or second recesses.

In accordance with yet another aspect of the present invention, a method is provided for securing a hitch ball to a hitch ball receiver. The method includes the steps of (a) engaging a base of the hitch ball in an acircular recess in the hitch ball receiver and (b) securing a fastener for the hitch ball while engagement between the base and a sidewall of the recess prevents the hitch ball from rotating.

Advantageously, the engagement of the base of the hitch ball with the sidewall of the acircular recess prevents the hitch ball from rotating relative to the hitch ball receiver as the fastener is connected to the mounting shank of the hitch ball. Where the mounting shank is threaded and the fastener is a nut, this means that only a single wrench is required to secure the hitch ball to the hitch ball receiver. This allows far more convenient connection of the hitch ball to the hitch ball receiver as the user is only required to manipulate one tool to complete the connection process.

Additionally, it must be appreciated that the spacer allows the hitch ball receiver to be adapted to accept and receive a standard hitch ball: that is, one not incorporating a base specifically sized and shaped to be received in the recess. Thus, the hitch ball receiver is sufficiently versatile to receive and hold virtually any size and shape of hitch ball one might be expected to find in the marketplace.

In the following description there is shown and described several embodiments of the invention, simply by way of illustration of some of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain certain principles of the invention. In the drawings.

Reference will now be made in detail to the present preferred embodiments of the invention, examples of which are illustrated in the accompanying drawings.

DETAILED DESCRIPTION OF THE INVENTION

Figure 1:
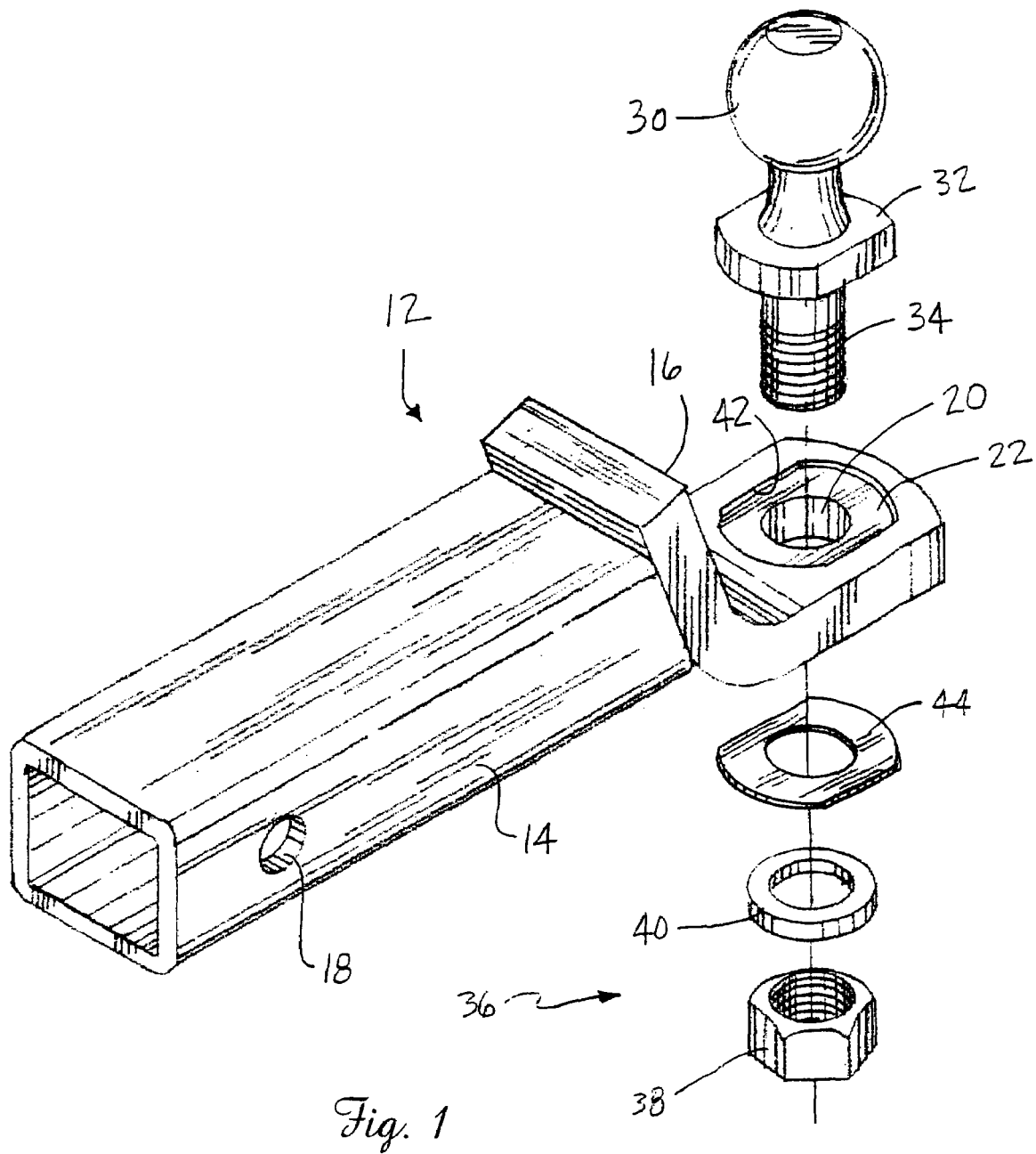
FIG. 1 is an exploded perspective view showing a first embodiment of the towing assembly of the present invention.

Reference is now made to FIG. 1 illustrating the first embodiment of the towing assembly 10 of the present invention. As illustrated the towing assembly 10 includes a hitch ball receiver 12 in the form of a hitch bar or draw bar. The hitch ball receiver 12 includes a body 14 formed from tubular steel such as a torque tube and a substantially L-shaped tongue 16 of plate steel attached to one end of the body. Aligned apertures 18 are provided in opposing sidewalls at one end of the body 14. These apertures 18 receive a connecting pin to secure the hitch ball receiver 12 in a trailer hitch receiver assembly of a type well known in the art that is mounted securely to the frame of a towing vehicle.

A hitch ball mounting aperture 20 is provided in the tongue 16 of the hitch ball receiver 12. A recess 22 is provided around the aperture 20 in a first face 24 of the tongue 16. A second recess 26 is provided around the mounting aperture 20 in a second face 28 of the tongue 16 (see also FIGS. 2-4). Stated another way, the hitch ball mounting aperture 20 is actually provided in the two recesses 22, 26. The recesses 22, 26 are acircular in shape. Accordingly, the recesses 22, 26 may assume, for example, an oval, polygonal, square, rectangular, hexagonal and star shape (see also FIGS. 6a-6d).

Figure 2:
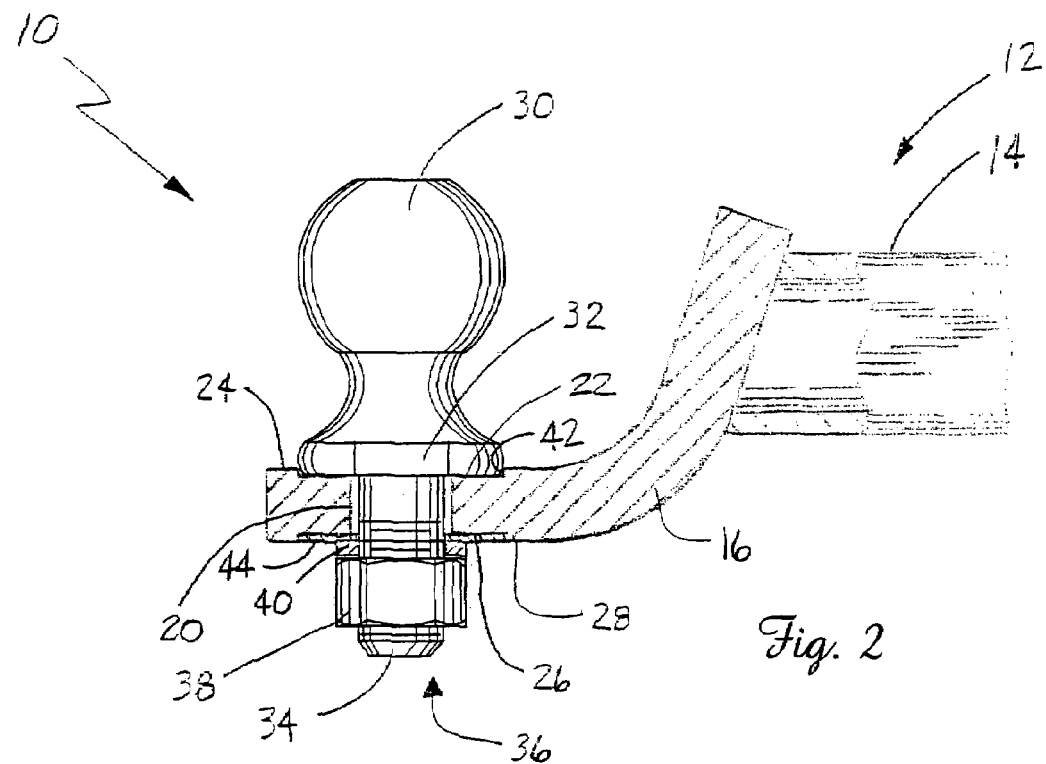
FIG. 2 is a cross sectional view showing the fully assembled towing assembly in a first operative position.
Figure 3:
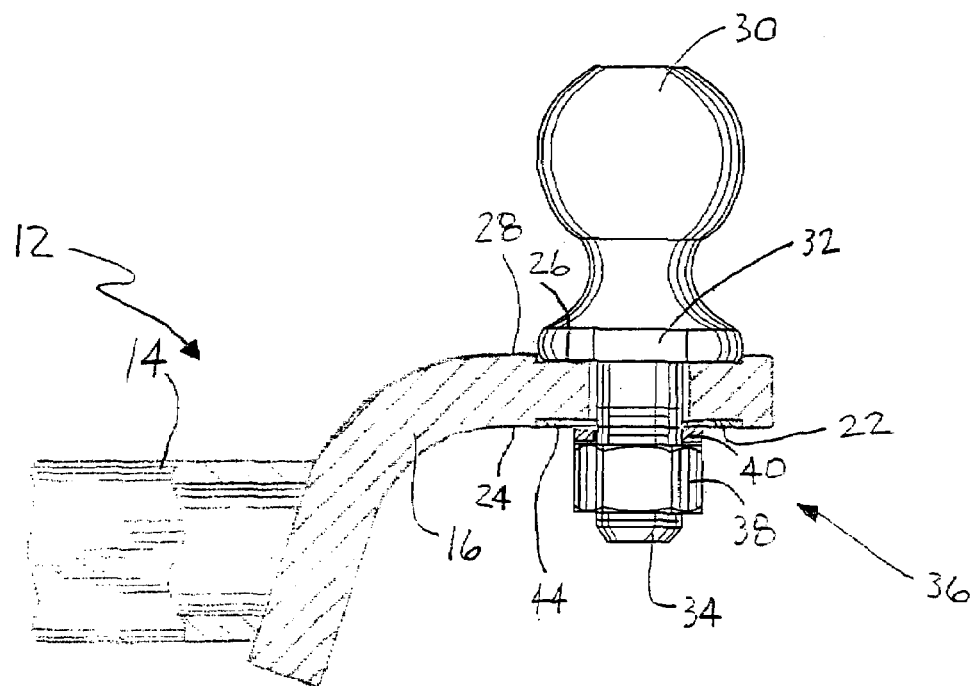
FIG. 3 is a cross sectional view similar to FIG. 2 but showing the towing assembly fully assembled in a second operating position.

The towing assembly 10 also includes a hitch ball 30 including a base 32 and threaded mounting shank 34. In accordance with an important aspect of the present invention, the base 32 is correspondingly sized and shaped to be received and held in either of the recesses 22, 26. Thus, the base 32 just fits in and completely fills the recess. As illustrated in FIGS. 1-3, the base 30 assumes a substantially oval shape with two flat sides.

The towing assembly 10 also includes a fastener 36 for engaging the shank 34 and securing the hitch ball 30 to the hitch ball receiver 12. As illustrated, the fastener 36 assumes the form of a nut 38 and a lock washer 40. Alternatively, a self-locking nut could be utilized.

The hitch ball 30 may be easily and conveniently connected to the hitch ball receiver 12. As illustrated in FIG. 2, the mounting shank 34 of the hitch ball 30 is aligned with and pushed through the hitch ball mounting aperture 20 in the hitch ball receiver 12. As this is done the base 32 of the hitch ball 30 is seated in the recess 22. Once fully seated, the sidewall 42 of the recess 22 engages a side or sides of the base 32 so as to effectively prevent the hitch ball 30 from rotating relative to the hitch ball receiver 12. The lock washer 40 is placed over the mounting shank 34 and the nut 38 is then tightened on that mounting shank 34 to complete the connection. During the tightening process, the engagement of the base 32 of the hitch ball 30 with the sidewall 42 of the recess 22 prevents rotation of the hitch ball in the hitch ball receiver 12 and therefore allows connection with a single tool.

As should be appreciated, the hitch ball receiver 12 may be utilized with the tongue directed downward as illustrated in FIG. 2 or upward as illustrated in FIG. 3. Since the tongue 16 includes a recess 22 and 26 on each of the faces 24, 28, the base 32 of a hitch ball 30 is received in one recess or the other when the hitch ball receiver 12 is placed in either operating position. Accordingly, the hitch ball 30 is prevented from rotation in either operating position to allow simple and convenient connection.

Figure 4:
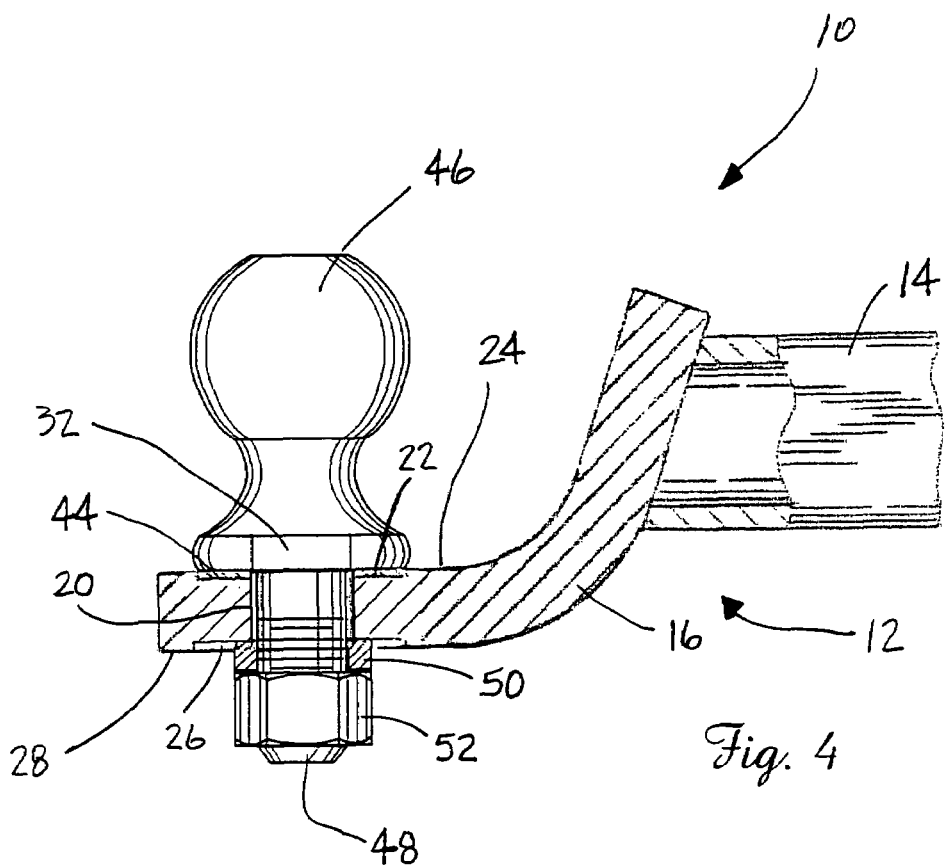
FIG. 4 is a cross sectional view similar to FIGS. 2 and 3 showing the hitch ball receiver of the towing assembly holding a standard hitch ball with a circular base.

As best illustrated in FIG. 4, the hitch receiver 12 also accommodates a standard hitch ball incorporating, for example, a circular base that is not sized and shaped to be received in the recess 22 or 26. More specifically, the towing assembly 10 also incorporates a spacer 44 sized and shaped to be received in the recess 22 or 26 so as to fully fill the recess. Before connecting the standard hitch ball 46 to the hitch ball receiver 12, the spacer 44 is placed in the recess 22. The mounting shank 48 of the standard hitch ball 46 is then positioned so as to be received in the aperture in the spacer 44 and the hitch ball mounting aperture 20 of the hitch receiver 12. The lock washer 50 is then placed over the shank 48 and the fastening nut 52 is tightened on the shank using any necessary tools in order to complete the connection.

When not in use in connecting a standard hitch ball 46, the spacer 44 may be stored in the recess 22 or 26 on the underside of the tongue 16 opposite the hitch ball 30 (see FIGS. 2 and 3). Since the spacer 44 fills that recess 22 or 26, a flat continuous surface is provided for engagement with the lock washer 40 and nut 38. Further, this allows the extra recess to be used as a storage position preventing one from inadvertently losing the spacer 44.

Figure 5:
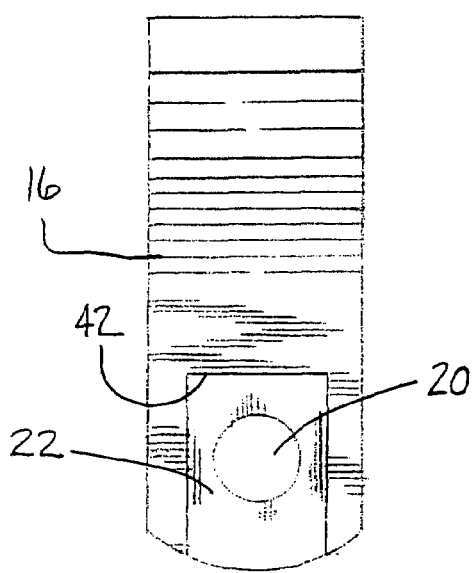
FIG. 5 is a top plan view showing an alternative embodiment of the hitch ball receiver incorporating a channel cut recess.

The recesses 22, 26 illustrated in FIGS. 1-4 and 6a-6 all have a continuous sidewall. It should be appreciated, however, that the recesses 22, 26 may also be formed as a channel cut recess such as illustrated in FIG. 5. This three-sided channel recess 22, 26 may be relatively easily and economically machined in the tongue 16 of the hitch receiver 12.

Figure 6A:
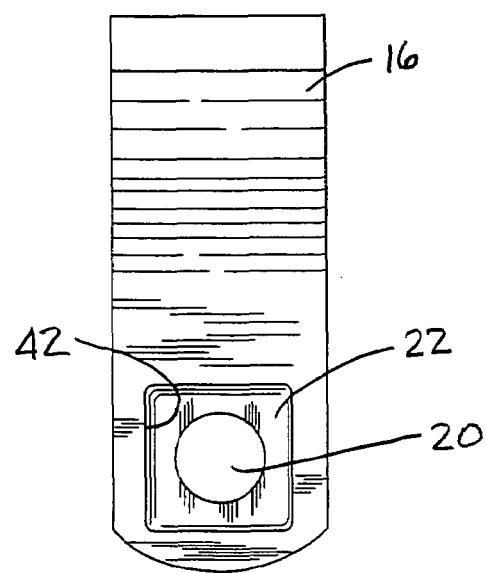
FIGS. 6a-6d are four top plan views illustrating additional alternative embodiments; that is, recesses of square, rectangular, star and hexagonal shape.
Figures 6B, 6C, 6D:
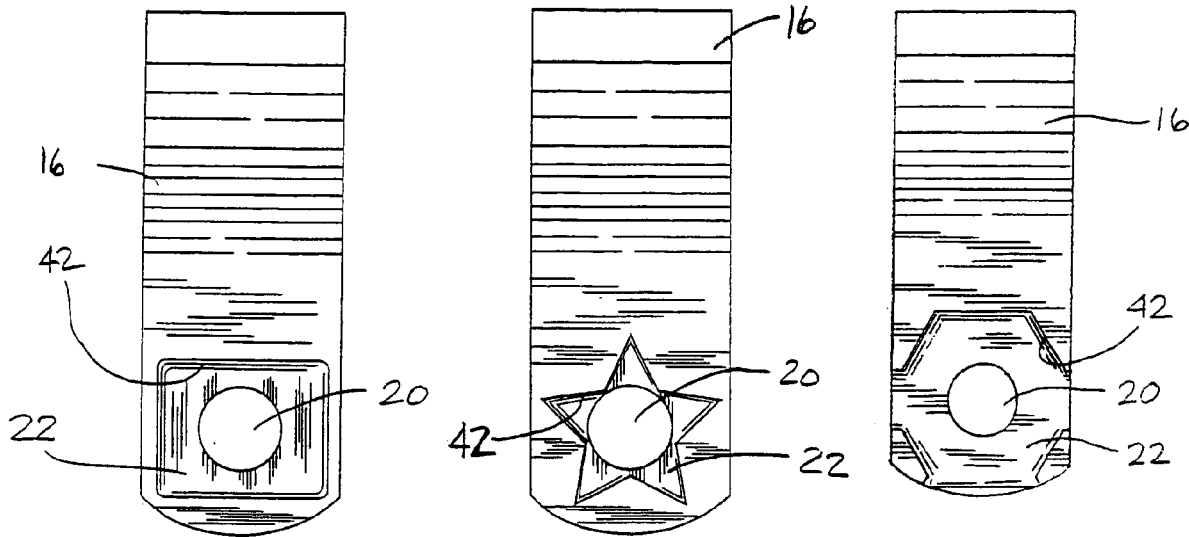

In FIG. 6d, a six sided or hexagonal recess is illustrated. Where this recess 22 measures more than about 2.4 inches across, the recess is large enough to accommodate substantially any standard hitch ball base: that is, the standard hitch ball base is received in the recess and seats flat against the bottom wall of the recess. In this situation, there is no need for any form of spacer in order to accommodate a standard hitch ball. As such, in this particular embodiment, no separate spacer is necessary.

Figure 7:
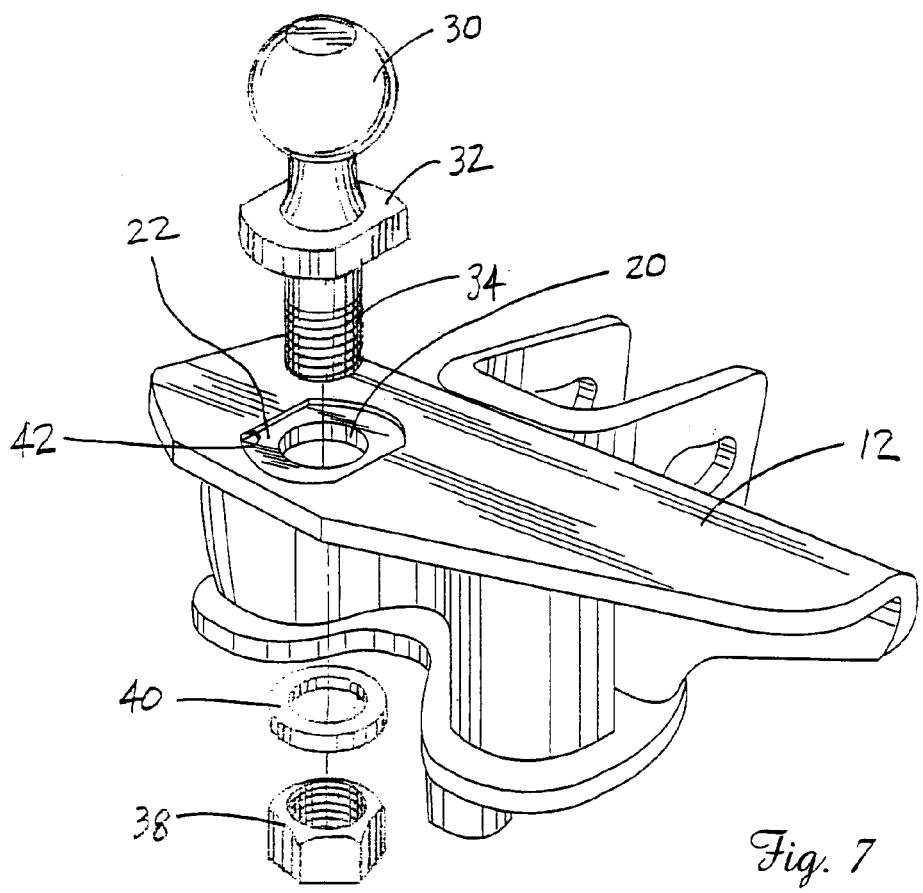
FIG. 7 is a perspective view of yet another alternative embodiment of the present invention wherein the hitch ball receiver is a ball mount head.

Yet another alternative embodiment of the invention is illustrated in FIG. 7. In the FIG. 7 embodiment of the towing assembly 60, the hitch ball receiver 12 is a ball mount head of a type typically utilized on a weight distributing trailer hitch receiver assembly. Such assemblies, in the absence of a recess 22 to lock a hitch ball in position against rotation, are relatively well-known in the art.

As illustrated in FIG. 7 the hitch ball 30 is positioned on the ball mount head 12 by aligning and projecting the mounting shank 34 thereof through the mounting aperture 20 in the hitch ball receiver. As noted above, the hitch ball 30 is fully seated when the base 32 thereof is received in the recess 22 and the sidewalls of the recess 42 engage the base. The lock washer 40 may then be positioned over the mounting shank 34 and the fastener or nut 38 tightened thereto in order to complete the connection.

The foregoing description of the preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth, to which they are fairly, legally and equitably entitled. The drawings and preferred embodiment do not and are not intended to limit the ordinary meaning of the claims and their fair and broad interpretation in any way.

The invention claimed is:

1. A towing assembly, comprising:
   a hitch ball receiver having a first face and a second face, wherein said first face includes at least one acircular recess having a sidewall and said second face includes a second recess;
   a spacer sized and shaped to be received in either of said recess and said second recess;
   a hitch ball; and
   a base integrally formed with the hitch ball, the base having a perimeter, wherein a substantial portion of the perimeter of the base is engageable with the sidewall of the recess to prevent rotation of the hitch ball during installation.

2. The towing assembly of claim 1, wherein said recess and said second recess having a substantially oval shape with two parallel flats thereon.

3. The towing assembly of claim 1, wherein said recess is a channel.

4. The towing assembly of claim 3, wherein said hitch ball receiver is a ball mount head.

5. The towing assembly of claim 1, wherein said hitch ball receiver is a hitch bar.

6. The towing assembly of claim 5, wherein said hitch bar includes a tongue.

7. The towing assembly of claim 6 wherein said recess is provided in said tongue.

8. The towing assembly of claim 7, wherein said tongue includes said first face and said second face, said recess being provided in said first face.

9. The towing assembly of claim 8, further including said second recess, said second recess being provided in said second face.

10. The towing assembly of claim 9, further including a spacer sized and shaped to be received in either of said recess or said second recess.

11. The towing assembly of claim 10, wherein said recess and said second recess have a substantially oval shape with two parallel flats thereon.

12. A towing assembly, comprising:
    a hitch ball receiver having at least one acircular recess having a sidewall;
    a hitch ball; and
    a base integrally formed with the hitch ball, wherein the base is engageable with the sidewall of the recess to prevent rotation of the hitch ball during installation wherein said hitch ball receiver includes a first face and a second face, said recess and a second recess being provided in said first face and said second face,
    respectively, wherein said base further including a spacer sized and shaped to be received in either of said recess and said second recess.

13. The towing assembly of claim 12 wherein a perimeter of the base corresponds in length to a perimeter of the sidewall.

14. The towing assembly of claim 13 wherein the base engages a substantial portion of the perimeter of the sidewall to prevent rotation of the hitch ball during installation.

* * * * *